United States Patent
An et al.

(10) Patent No.: US 12,068,455 B2
(45) Date of Patent: Aug. 20, 2024

(54) NON-AQUEOUS ELECTROLYTE SOLUTION FOR LITHIUM SECONDARY BATTERY AND LITHIUM SECONDARY BATTERY INCLUDING THE SAME

(71) Applicant: LG Energy Solution, Ltd., Seoul (KR)

(72) Inventors: Yu Ha An, Daejeon (KR); Hyun Seung Kim, Daejeon (KR); Jeong Woo Oh, Daejeon (KR); Chul Haeng Lee, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 0 days.

(21) Appl. No.: 17/802,449

(22) PCT Filed: Oct. 20, 2021

(86) PCT No.: PCT/KR2021/014668
§ 371 (c)(1),
(2) Date: Aug. 25, 2022

(87) PCT Pub. No.: WO2022/092688
PCT Pub. Date: May 5, 2022

(65) Prior Publication Data
US 2023/0098167 A1    Mar. 30, 2023

(30) Foreign Application Priority Data
Oct. 27, 2020  (KR) .......... 10-2020-0140126

(51) Int. Cl.
H01M 10/0567   (2010.01)
H01M 10/052    (2010.01)
H01M 10/0568   (2010.01)
H01M 10/0569   (2010.01)

(52) U.S. Cl.
CPC ..... *H01M 10/0567* (2013.01); *H01M 10/052* (2013.01); *H01M 10/0568* (2013.01); *H01M 10/0569* (2013.01); *H01M 2300/0037* (2013.01)

(58) Field of Classification Search
None
See application file for complete search history.

(56) References Cited

U.S. PATENT DOCUMENTS

| | | |
|---|---|---|
| 2002/0192565 A1 | 12/2002 | Ueda et al. |
| 2013/0252113 A1 * | 9/2013 | Yu .............. H01M 10/0567 429/329 |
| 2016/0020488 A1 | 1/2016 | Cho et al. |
| 2018/0233778 A1 | 8/2018 | Park et al. |
| 2020/0044287 A1 | 2/2020 | Kim et al. |
| 2020/0251777 A1 | 8/2020 | Lim et al. |
| 2021/0328266 A1 | 10/2021 | Kim et al. |
| 2022/0131192 A1 | 4/2022 | Kim et al. |
| 2022/0140391 A1 | 5/2022 | Kim et al. |

FOREIGN PATENT DOCUMENTS

| | | | |
|---|---|---|---|
| CN | 106099181 A | 11/2016 | |
| EP | 3518334 A1 | 7/2019 | |
| EP | 3893312 A1 | 10/2021 | |
| JP | 2001006729 A | 1/2001 | |
| JP | 2002329528 A | 11/2002 | |
| JP | 2010218983 A | 9/2010 | |
| JP | 4867208 B2 | 2/2012 | |
| KR | 20020063501 A | 8/2002 | |
| KR | 20080011693 A | 2/2008 | |
| KR | 20160009399 A | 1/2016 | |
| KR | 20180093700 A | 8/2018 | |
| KR | 20190008100 A | 1/2019 | |
| KR | 20190059256 A | 5/2019 | |
| KR | 20200074902 A | 6/2020 | |
| KR | 20200089623 A | 7/2020 | |
| KR | 20200105227 A | 9/2020 | |
| WO | WO-2019013501 A1 * | 1/2019 | ........... C07C 229/30 |
| WO | 2020149678 A1 | 7/2020 | |

OTHER PUBLICATIONS

International Search Report for Application No. PCT/KR2021/014668 mailed Feb. 4, 2022, 2 pages.
Extended European Search Report for Application No. 21886682.0 dated Oct. 19, 2023. 11 pgs.

* cited by examiner

*Primary Examiner* — Carlos Barcena
(74) *Attorney, Agent, or Firm* — Lerner David LLP

(57) ABSTRACT

The present disclosure relates to a non-aqueous electrolyte solution for a lithium secondary battery, and the non-aqueous electrolyte solution includes: a lithium salt; an organic solvent; and an additive including vinylene carbonate, vinyl ethylene carbonate, and a compound represented by chemical formula 1:

[Chemical formula 1]

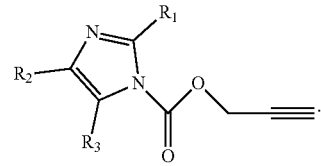

Herein, each of R1 to R3 is independently hydrogen or an alkyl group having 1 to 3 carbon atoms.

5 Claims, No Drawings

NON-AQUEOUS ELECTROLYTE SOLUTION FOR LITHIUM SECONDARY BATTERY AND LITHIUM SECONDARY BATTERY INCLUDING THE SAME

CROSS-REFERENCE TO RELATED APPLICATIONS

The present application is a national stage entry under 35 U.S.C. § 371 of International Application No. PCT/KR2021/014668 filed on Oct. 20, 2021, which claims priority from Korean Patent Application No. 10-2020-0140126 filed on Oct. 27, 2020, all the disclosures of which are incorporated herein by reference.

TECHNICAL FIELD

The present invention relates to a non-aqueous electrolyte solution for a lithium secondary battery, and a lithium secondary battery including the same, and more particularly, to a non-aqueous electrolyte solution for a secondary battery capable of improving high temperature performance of a battery, and a secondary battery including the same.

BACKGROUND ART

Recently, the interest in developing energy storage technology is on the increase, and as the applied fields are expanded to mobile phones, camcorders and laptop PCs, and electric vehicles, efforts on the research and development of electrochemical elements are currently embodied.

Among electrochemical devices, the interest in the development of secondary batteries is on the increase, and particularly, lithium secondary batteries developed in 1990s have been spotlighted with the advantages that the operating voltage is high and the energy density is large.

In the case of a lithium secondary battery system, unlike an initial period when lithium metal was directly applied to a system, a transition metal oxide containing lithium is used as the positive electrode material, and carbon-based materials such as graphite and alloy-based materials such as silicon are applied to the negative electrode as the negative electrode material. In this way, a system, in which lithium metal is not directly used in a battery, is currently implemented.

Such a lithium secondary battery is composed of a positive electrode composed of a transition metal oxide containing lithium, a negative electrode capable of storing lithium, an electrolyte solution used for transferring lithium ions, and a separator. Herein, the electrolyte solution is known as a component which significantly affects the stability and safety of the battery, and a lot of researches on the electrolyte solution are currently conducted.

An electrolyte solution for a lithium secondary battery is composed of a lithium salt, an organic solvent which dissolves the lithium salt, and a functional additive. Herein, in order to improve electrochemical characteristics of the battery, it is important to appropriately select these components.

With respect to the electrode material of the lithium ion battery, particularly in the case of a negative electrode, a graphite-based negative electrode is usually used. In this case, a SEI film is formed as side reaction, in which the used electrolyte solution is decomposed, occurs. However, if the SEI film fails to have a passivation capability enough to suppress additional decomposition of the electrolyte solution, the electrolyte solution is additionally decomposed during storage, thereby accelerating degeneration of the charged battery and being a cause of gas generation.

Further, $LiPF_6$ is mainly used as the lithium salt in a non-aqueous electrolyte solution. Since anion $PF_6^-$ is vulnerable to heat, Lewis acid such as $PF_5$ is generated due to thermal decomposition when a battery is exposed to a high temperature, and such $PF_5$ causes decomposition of carbonate-based organic solvent itself and accelerates elution of transition metal of the positive electrode active material by generating HF. Such an eluted transition metal may be deposited on a positive electrode to thereby become a cause of increasing the resistance of the positive electrode or may be deposited on the negative electrode to thereby cause the self-discharge of the negative electrode and additional consumption of lithium ions through destruction and regeneration of the SEI film.

Further, in a high temperature environment, as the SEI film is gradually collapsed by increased electrochemical energy and thermal energy, side reaction, in which the exposed negative electrode active material surface reacts with the solvent of the electrolyte solution to thereby be decomposed, continually occurs, thereby increasing the resistance of the electrolyte solution and deteriorating the overall performance of the battery. Further, such a side reaction causes generation of gas inside the battery. Such continuous gas generation increases the internal pressure of the lithium secondary battery in a high temperature and decreases the lifespan of the battery.

DISCLOSURE

Technical Problem

The present invention is believed to solve at least some of the above problems. For example, an aspect of the present invention provides a non-aqueous electrolyte solution capable of effectively removing $PF_5$, which may be generated in a high temperature environment, and suppressing gas generation by side reaction in a high temperature, and a lithium secondary battery having an improved battery performance in a high temperature through the non-aqueous electrolyte solution.

Technical Solution

A non-aqueous electrolyte solution for a lithium secondary battery according to the present invention includes: a lithium salt; an organic solvent; and an additive.

The additive includes vinylene carbonate, vinyl ethylene carbonate, and a compound represented by a following chemical formula 1:

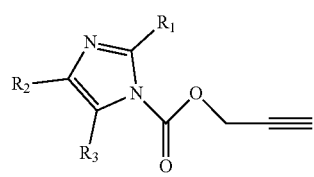

[Chemical formula 1]

Herein, each of R1 to R3 is independently hydrogen or an alkyl group having 1 to 3 carbon atoms.

In a specific example, an amount of the vinylene carbonate contained in the electrolyte solution may correspond to 0.01 to 10 wt % of the total weight of the electrolyte solution.

Further, an amount of the vinyl ethylene carbonate contained in the electrolyte solution may correspond to 0.01 to 5 wt % of the total weight of the electrolyte solution.

Further, an amount of the compound represented by the chemical formula 1 contained in the electrolyte solution may correspond to 0.01 to 3 wt % of the total weight of the electrolyte solution.

In a specific example, a weight ratio of the vinylene carbonate to the compound represented by the chemical formula 1 may be in a range of 2:1 to 30:1.

Further, a weight ratio of the vinyl ethylene carbonate to the compound represented by the chemical formula 1 may be in a range of 1.5:1 to 10:1.

In a specific example, the compound represented by the chemical formula 1 is a compound represented by following chemical formula 1a:

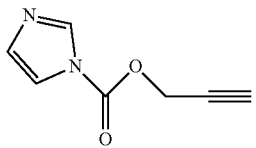

[Chemical formula 1a]

In a specific example, the non-aqueous electrolyte solution according to the present invention may further include at least one additive selected from the group consisting of a halogen-substituted or unsubstituted cyclic carbonate compound, a nitrile compound, a phosphate compound, a borate compound, a sultone compound, a lithium salt compound, and a sulfate compound.

In a specific example, the lithium salt may contain $LiPF_6$.

The organic solvent may include a linear carbonate compound and a cyclic carbonate compound.

Further, the present invention provides a lithium secondary battery, and the lithium secondary battery includes: a positive electrode; a negative electrode; a separator; and the above-described non-aqueous electrolyte solution for a lithium secondary battery.

Advantageous Effects

The additive, which is included in the non-aqueous electrolyte solution of the present invention, effectively removes by-products generated from a lithium salt, and suppresses gas generation by side reaction, thereby suppressing a rapid rise of the resistance and increase of the thickness of the battery, and thereby improving high temperature characteristics.

Further, since the non-aqueous electrolyte solution for a lithium secondary battery can form a firm SEI film on the negative electrode, it is possible to provide a lithium secondary battery having excellent high temperature characteristics while maintaining excellent capacity characteristics.

DETAILED DESCRIPTION OF THE PREFERRED EMBODIMENTS

Hereinafter, the present invention will be described in detail with reference to the drawings. The terms and words used in the present specification and claims should not be construed as limited to ordinary or dictionary terms and the inventor may properly define the concept of the terms in order to best describe its invention. The terms and words should be construed as meaning and concept consistent with the technical idea of the present invention.

In this application, it should be understood that terms such as "include" or "have" are intended to indicate that there is a feature, number, step, operation, component, part, or a combination thereof described on the specification, and they do not exclude in advance the possibility of the presence or addition of one or more other features or numbers, steps, operations, components, parts or combinations thereof. Also, when a portion such as a layer, a film, an area, a plate, etc. is referred to as being "on" another portion, this includes not only the case where the portion is "directly on" the another portion but also the case where further another portion is interposed therebetween. On the other hand, when a portion such as a layer, a film, an area, a plate, etc. is referred to as being "under" another portion, this includes not only the case where the portion is "directly under" the another portion but also the case where further another portion is interposed therebetween. In addition, to be disposed "on" in the present application may include the case disposed at the bottom as well as the top.

Further, in the wording "carbon number a to b" of the present specification, "a" and "b" means the number of carbon atoms included in a specific functional group. Namely, the functional group may include a to b carbon atoms. For example, "alkylene group of carbon number 1 to 5" means an alkylene group having 1 to 5 carbon atoms, namely, $-CH_2-$, $-CH_2CH_2-$, $-CH_2CH_2CH_2-$, $-CH_2CH(CH_3)-$, $-CH(CH_3)CH_2-$ and $-CH(CH_3)CH_2CH_2-$, etc.

The alkylene group means a monovalent saturated hydrocarbon group.

Non-Aqueous Electrolyte Solution for Lithium Secondary Battery

A non-aqueous electrolyte solution for a lithium secondary battery according to the present invention includes: a lithium salt; an organic solvent; and an additive.

The additive includes vinylene carbonate, vinyl ethylene carbonate, and a compound represented by a following chemical formula 1:

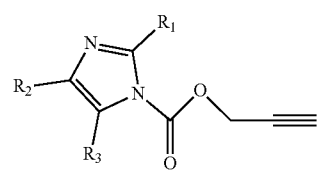

[Chemical formula 1]

Herein, each of R1 to R3 is independently hydrogen or an alkyl group having 1 to 3 carbon atoms.

(1) Lithium Salt

In the non-aqueous electrolyte solution for a lithium secondary battery according to an embodiment of the present invention, the lithium salt contains $LiPF_6$, and what is generally used in the electrolyte solution for a lithium secondary battery in addition to $LiPF_6$ may be used without limitation. For example, $Li^+$ is included as the cation of the lithium salt, and at least one selected from the group consisting of $F^-$, $Cl^-$, $Br^-$, $I^-$, $NO_3^-$, $N(CN)_2^-$, $ClO_4^-$, $BF_4^-$, $B_{10}Cl_{10}^-$, $PF_6^-$, $CF_3SO_3^-$, $CH_3CO_2^-$, $CF_3CO_2^-$, $AsF_6^-$, $SbF_6^-$, $AlCl_4^-$, $AlO_4^-$, $CH_3SO_3^-$, $BF_2C_2O_4^-$, $BC_4O_8^-$, $PF_4C_2O_4^-$, $PF_2C_4O_8^-$, $(CF_3)_2PF_4^-$, $(CF_3)_3PF_3^-$, $(CF_3)_4PF_2^-$, $(CF_3)_5PF^-$, $C_4F_9SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $SCN^-$ and $(CF_3CF_2SO_2)_2N^-$ may be included as the anion.

Specifically, the lithium salt may contain one or a combination of two or more selected from the group consisting of LiCl, LiBr, LiI, $LiClO_4$, $LiBF_4$, $LiB_{10}Cl_{10}$, $LiPF_6$, $LiCF_3SO_3$, $LiCH_3CO_2$, $LiCF_3CO_2$, $LiAsF_6$, $LiSbF_6$, $LiAlCl_4$, $LiAlO_4$, $LiCH_3SO_3$, LiFSI (lithium bis(fluorosulfonyl) imide, $LiN(SO_2F)_2)$, LiTFSI (lithium bis(trifluoromethanesulfonyl)imide, $LiN(SO_2CF_3)_2)$ and LiBETI (lithium bis(perfluoroethanesulfonyl)imide, $LiN(SO_2C_2F_5)_2)$. More specifically, the lithium salt may contain one or a mixture of two or more selected from group consisting of $LiPF_6$, $LiBF_4$, $LiCH_3CO_2$, $LiCF_3CO_2$, $LiCH_3SO_3$, LiFSI, LiTFSI and $LiN(C_2F_5SO_2)_2$.

The lithium salt can be appropriately changed within a typically available range, but specifically, 0.1M to 3M lithium salt and more specifically 0.8M to 2.5M lithium salt may be included in the electrolyte solution. If the concentration of the lithium salt exceeds 3M, the viscosity of the non-aqueous electrolyte solution is increased, and the lithium ion transfer effect is lowered and the non-aqueous electrolyte solution wettability is lowered, so that it is difficult to form a SEI film having a uniform thickness on the surface of the electrode.

(2) Organic Solvent

The organic solvent may be minimized in decomposition by oxidation reaction during the charge/discharge of the secondary battery, and there is no limit to the kind of the organic solvent as long as it can show desired characteristics together with the additive. For example, a carbonate organic solvent, an ether organic solvent or an ester organic solvent, and the like can be used alone or in combination of two or more.

The carbonate organic solvent in the organic solvent may include at least one of a cyclic carbonate organic solvent and a linear carbonate organic solvent. Specifically, the cyclic carbonate-based organic solvent may include at least one selected from the group consisting of ethylene carbonate (EC), propylene carbonate (PC), 1,2-butylene carbonate, 2,3-butylene carbonate, 1,2-pentylene carbonate, 2,3-pentylene carbonate, vinylene carbonate and fluoroethylene carbonate (FEC), and may specifically include a mixed solvent of ethylene carbonate having a high dielectric constant, and propylene carbonate having a relatively low melting point, compared to ethylene carbonate.

Further, the linear carbonate-based organic solvent is a solvent having a low viscosity and a low dielectric constant and may include at least one selected from the group consisting of dimethyl carbonate (DMC), diethyl carbonate (DEC), dipropyl carbonate, ethyl methyl carbonate (EMC), methylpropyl carbonate, and ethylpropyl carbonate, and may specifically include dimethyl carbonate.

In addition, as the ether-based organic solvent, any one selected from the group consisting of dimethyl ether, diethyl ether, dipropyl ether, methylethyl ether, methylpropyl ether, and ethylpropyl ether, or a mixture of two or more thereof may be used, but is not limited thereto.

The ester-based organic solvent may be at least one selected from the group consisting of a linear ester-based organic solvent and a cyclic ester-based organic solvent.

At this time, one or a mixture of two or more selected from the group consisting of methyl acetate, ethyl acetate, propyl acetate, methyl propionate, ethyl propionate, propyl propionate, and butyl propionate may be used as the linear ester-based organic solvent, but the present invention is not limited to these examples.

One or a mixture of two or more selected from the group consisting of γ-butyrolactone, γ-valerolactone, γ-caprolactone, σ-valerolactone, and ε-caprolactone may be used as the cyclic ester-based organic solvent, but the present invention is not limited to these examples.

A cyclic carbonate-based organic solvent having a high viscosity capable of easily dissociating lithium salt in the electrolyte due to a high dielectric constant may be used as the organic solvent. Further, in order to manufacture an electrolyte having a higher electrical conductivity, a linear carbonate compound and a linear ester compound having a low viscosity and a low dielectric constant, such as dimethyl carbonate and diethyl carbonate, may be mixed together with the cyclic carbonate-based organic solvent at an appropriate ratio.

More specifically, the organic solvent may be obtained by mixing the cyclic carbonate compound with the linear carbonate compound, and the weight ratio of the cyclic carbonate compound and the linear carbonate compound may be in the range of 10:90 to 70:30.

(3) Additive

Further, the non-aqueous electrolyte solution for a lithium secondary battery according to the present invention includes vinylene carbonate, vinyl ethylene carbonate, and a compound represented by the following chemical formula 1:

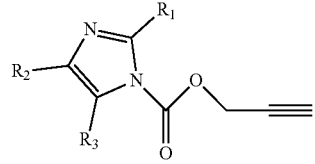

[Chemical formula 1]

Herein, each of R1 to R3 is independently hydrogen or an alkyl group having 1 to 3 carbon atoms.

Vinylene carbonate (VC) and vinyl ethylene carbonate (VEC) are a kind of vinylidene carbonate compound, and when they are added to an electrolyte solution, they may be decomposed at the initial formation process, thereby quickly and stably forming an SEI film. Particularly, when vinylene carbonate (VC) is used as the additive, the SEI film may be stably formed, but a lot of gases may be generated in a high temperature environment, thereby causing a swelling phenomenon to the battery. As such, such gas generation can be suppressed by adding vinyl ethylene carbonate (VEC) together.

Further, since the compound represented by the chemical formula 1 contains a functional group which functions as a Lewis base containing a nitrogen element in the structure, it is not possible to suppress decomposition of anions such as $PF_6$, but it is possible to remove Lewis acid such as HF and $PF_5$, which are decomposition products produced by the decomposition of anions. Hence, it is possible to suppress deterioration due to chemical reaction of the film on the surface of the positive electrode or the negative electrode resulting from the Lewis acid. In particular, the compound of chemical formula 1 can effectively remove Lewis acid, which is a decomposition product of a lithium salt, by an imidazole functional group. As a result, since it is possible to prevent additional electrolyte solution decomposition of the battery by destruction of the film by preventing deterioration of the film, if it is finally possible to suppress self-discharge of the battery.

In an embodiment of the present invention, a compound represented by following chemical formula 1a is more effective in removing $PF_5$ as the compound represented by the chemical formula 1.

[Chemical formula 1a]

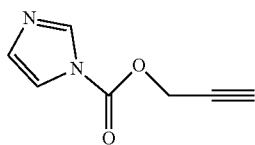

In the present invention, the content of the vinylene carbonate (VC) may correspond to 0.01 to 10 wt %, specifically 0.05 to 8 wt %, and more specifically 0.05 to 5 wt % of the total weight of the electrolyte solution. When the content of the vinylene carbonate (VC) is in the above range, a stable SEI film may be formed on the surface of the negative electrode.

Further, the content of the vinyl ethylene carbonate (VEC) may correspond to 0.01 to 5 wt % and specifically 0.05 to 3 wt % of the total weight of the electrolyte solution. When the content of the vinyl ethylene carbonate (VEC) is in the above range, a stable SEI film may be formed on the surface of the negative electrode, and gas generation may be effectively suppressed.

Further, the content of the compound represented by the chemical formula 1 may correspond to 0.01 to 3 wt %, specifically 0.01 to 2 wt %, and more specifically 0.01 to 1 wt % of the total weight of the electrolyte solution. When the content of the compound represented by the chemical formula 1 is in the above range, the effects of removing by-products and suppressing metal elution are excellent, thereby improving battery performance in a high temperature.

Further, in a non-aqueous electrolyte solution for a lithium secondary battery according to the present invention, the weight ratio of the vinylene carbonate to the compound represented by the chemical formula 1 may be in the range of 2:1 to 30:1, and the weight ratio of the vinyl ethylene carbonate to the compound represented by the chemical formula 1 may be in the range of 1.5:1 to 10:1. More specifically, the weight ratio of the vinylene carbonate to the compound represented by the chemical formula 1 may be in the range of 3:1 to 20:1, 3:1 to 10:1, or 3:1 to 5:1, and the weight ratio of the vinyl ethylene carbonate to the compound represented by the chemical formula 1 may be in the range of 2:1 to 8:1, 2:1 to 5:1, or 2:1 to 3:1. When content ratio of the additives is in the above range, secondary batteries having improved performance can be manufactured. Specifically, the content of additives is in the above range, performance in a high temperature can be improved by suppressing gas generation while forming a stable SEI film.

When the content of the additives is less the above range, it may be difficult to achieve desired effects, and when the content of the additives exceeds the above range, side reaction may excessively occur in the electrolyte solution at the time of charge and discharge of the battery, and unreacted substances or precipitated substances may exist in the electrolyte solution in a room temperature due to insufficient decomposition in a high temperature, thereby dropping the lifespan and resistance characteristics of the secondary battery.

Further, it is possible to include an additive which can form a stable film on the surface of the negative electrode and the positive electrode or suppress decomposition due to side reaction of a solvent in the non-aqueous electrolyte solution and act as a complementary element for improving mobility of lithium ions while not significantly increasing the initial resistance in addition to the effects of the mixed additive by being used together with the mixed additive.

Specifically, the non-aqueous electrolyte solution according to the present invention may further include at least one additive selected from the group consisting of a halogen-substituted or unsubstituted cyclic carbonate compound, a nitrile compound, a phosphate compound, a borate compound, a sultone compound, a lithium salt compound, and a sulfate compound.

Specifically, the halogen-substituted cyclic carbonate compound or the halogen-unsubstituted cyclic carbonate compound may improve durability of the battery by forming a stable SEI film on the surface of the negative electrode during battery activation.

Fluoroethylene carbonate (FEC) may be used as the halogen-substituted cyclic carbonate compound.

The content of the halogen-substituted cyclic carbonate compound or the halogen-unsubstituted cyclic carbonate compound may correspond to 5 or less wt % of the total weight of the non-aqueous electrolyte solution. When the content of the cyclic carbonate compound in the non-aqueous electrolyte solution exceeds 5 wt %, the cell swelling suppressing performance and initial resistance may be deteriorated.

When the nitrile compound is used together with the above-described mixed additive, effects of improvement of high temperature characteristics, etc. can be expected by positive/negative electrode film stabilization. Namely, it may act as a supplementary element in forming a negative electrode SEI film, suppress decomposition of a solvent in the electrolyte, and improve mobility of lithium ions. Examples of the nitrile compound may include at least one selected from the group consisting of succinonitrile, adiponitrile, acetonitrile, propionitrile, butyronitrile, valeronitrile, caprylonitrile, heptanenitrile, cyclopentane carbonitrile, cyclohexane carbonitrile, 2-fluorobenzonitrile, 4-fluorobenzonitrile, difluorobenzonitrile, trifluorobenzonitrile, phenylacetonitrile, 2-fluorophenylacetonitrile, 4-fluorophenylacetonitrile, 1,4-dicyano-2-butene, glutaronitrile, 1,3,6-hexanetricarbonitrile, and pimelonitrile.

The content of the nitrile compound may correspond to 8 or less wt % of the total weight of the non-aqueous electrolyte solution. When the total content of the nitrile compound in the non-aqueous electrolyte solution exceeds 8 wt %, the resistance increases due to the increase of the film formed on the surface of the electrode, thereby deteriorating the performance of the battery.

Further, since the phosphate compound stabilizes $PF_6$ anions in the electrolyte solution and helps formation of a positive electrode and negative electrode film, thereby improving durability of the battery. Some examples of the phosphate-based compounds may include at least one selected from the group consisting of lithium difluorophosphate (LiDFP, $LiPO_2F_2$), lithium tetramethyl trimethyl silyl phosphate, tris(trimethylsilyl) phosphite (TMSPi), tris(trimethylsilyl) phosphate (TMSPa), ethyl di(prop-2-yn-1-yl) phosphate, allyl diphosphate, tris(2,2,2-trifluoroethyl) phosphate (TFEPa) and tris(trifluoroethyl) phosphite, and the content of the phosphate-based compound may correspond to 3 or less wt % of the total weight of the non-aqueous electrolyte solution.

The borate compound may improve mobility of the lithium ions by promoting ion pair separation, lower the interface resistance of the SEI film, and may solve problems such as hydrofluoric acid gas generation by dissociating materials such as LiF, which are generated during battery reaction and are not easily separated. LiBOB, LiB$(C_2O_4)_2$, lithium oxalyldifluoroborate, or tetramethyl tris(trimethylsilyl) borate (TMSB) may be used as the borate compound, and the content of the borate compound may be equal to or less than 3 wt % of the total weight of the non-aqueous electrolyte solution.

At least one compound selected from the group consisting of 1,3-propane sultone (PS), 1,4-butene sultone, ethane sultone, 1,3-propene sultone, and 1-methyl-1,3-propene sultone may be used as the sultone compound, and the content of the sultone compound may be in the range of 0.3 to 5 wt % and specifically 1 to 5 wt % of the total weight of the non-aqueous electrolyte solution. When the content of the sultone-based compound in the non-aqueous electrolyte solution exceeds 5 wt %, an excessively thick film may be formed on the surface of the electrode, thereby increasing the resistance and deteriorating the output, and the resistance may increase by a large amount of additives in the non-aqueous electrolyte solution, thereby deteriorating the output characteristics.

Further, the lithium salt-based compound is a compound which is different from a lithium salt contained in the non-aqueous electrolyte solution. Some examples of the lithium salt-based compound include one or more selected from the group consisting of lithium methylsulfate, lithium ethylsulfate, lithium 2-trifluoromethyl-4,5-dicyanoimidazole, lithium tetrafluorooxalatophosphate, LiODFB and LiBF$_4$, and the content of the lithium salt-based compound may be equal to or less than 3 wt % of the total weight of the non-aqueous electrolyte solution.

Further, some examples of the sulfate compound may include ethylene sulfate, trimethylene sulfate (TMS), and methyltrimethylene sulfate (MTMS), and the content of the sulfate compound may correspond to 3 wt % or less of the total weight of the non-aqueous electrolyte solution.

Two or more kinds of additives can be mixed and used, and the content of the second additives may correspond to 15 or less wt %, preferably 0.01 to 10 wt %, and more preferably 0.1 to 5.0 wt % of the total weight of the electrolyte solution.

When the content of additives, which may be additionally added, is less than 0.01 wt %, high temperature storage characteristics and gas reduction effects, which are intended to be implemented from the additive, are very weak, and if the content exceeds 15 wt %, the side reaction may excessively occur. In particular, when a large amount of additives are added, they may not be sufficiently decomposed and may remain in a precipitated or unreacted state in the electrolyte solution at a room temperature. As such, the resistance increases, and the lifespan characteristics of the secondary battery may be deteriorated.

Lithium Secondary Battery

Further, in an embodiment of the present invention, a lithium secondary battery including a non-aqueous electrolyte solution for a secondary battery of the present invention is provided.

A lithium secondary battery of the present invention includes: a positive electrode; a negative electrode; a separator; and the above-described electrolyte solution for a lithium secondary battery. Specifically, the lithium secondary battery can be manufactured by injecting the non-aqueous electrolyte solution of the present invention into an electrode assembly which is obtained as a positive electrode, a negative electrode, and a separator interposed between the positive electrode and the negative electrode are sequentially laminated. At this time, a positive electrode, a negative electrode and a separator, which have been commonly used in manufacturing a lithium secondary battery, may be used as the positive electrode, the negative electrode, and the separator which form an electrode assembly.

Further, the positive electrode and the negative electrode, which form a lithium secondary battery of the present invention, can be manufactured in a general method and used.

(1) Positive Electrode

The positive electrode may be manufactured by forming a positive electrode mixture layer on a positive electrode current collector. The positive electrode mixture layer can be formed by coating a positive electrode slurry, which includes a positive electrode active material, a binder, a conductive material, and a solvent, on a positive electrode current collector, and then drying the slurry and rolling the positive electrode current collector.

The positive electrode current collector is not particularly limited as long as it has conductivity without causing a chemical change in the battery. Examples of the positive electrode current collector include stainless steel, aluminum, nickel, titanium, sintered carbon or aluminum or stainless steel of which the surface has been treated with carbon, nickel, titanium, silver, or the like.

The positive electrode active material is a compound capable of reversible intercalation and deintercalation of lithium, and may specifically include a lithium metal oxide containing lithium and at least one metal such as cobalt, manganese, nickel or aluminum. Specifically, some examples of the lithium metal oxide may include lithium-nickel-manganese-cobalt-based oxide (e.g., Li(Ni$_p$Co$_q$Mn$_{r1}$)O$_2$ (herein, 0<p<1, 0<q<1, 0<r1<1, p+q+r1=1), or Li(Ni$_{p1}$Co$_{q1}$Mn$_{r2}$)O$_4$ (herein, 0<p1<2, 0<q1<2, 0<r2<2, p1+q1+r2=2), etc.), or lithium-nickel-cobalt-transition metal (M) oxide (e.g., Li(Ni$_{p2}$Co$_{q2}$Mn$_{r3}$M$_{S2}$)O$_2$ (herein, M is one selected from the group consisting of Al, Fe, V, Cr, Ti, Ta, Mg and Mo, and p2, q2, r3 and s2 are atomic fractions of respectively independent elements, and 0<p2<1, 0<q2<1, 0<r3<1, 0<s2<1, p2+q2+r3+s2=1), etc.). Examples of the positive electrode active material may include Li(Ni$_{1/3}$Mn$_{1/3}$Co$_{1/3}$)O$_2$, Li(Ni$_{0.35}$Mn$_{0.28}$Co$_{0.37}$)O$_2$, Li(Ni$_{0.6}$Mn$_{0.2}$Co$_{0.2}$)O$_2$, Li(Ni$_{0.5}$Mn$_{0.3}$Co$_{0.2}$)O$_2$, Li(Ni$_{0.7}$Mn$_{0.15}$Co$_{0.15}$)O$_2$, Li(Ni$_{0.8}$Mn$_{0.1}$Co$_{0.1}$)O$_2$, Li(Ni$_{0.8}$Co$_{0.15}$Al$_{0.05}$)O$_2$ and Li[Ni$_{0.86}$Co$_{0.05}$Mn$_{0.07}$Al$_{0.02}$]O$_2$.

The content of the positive electrode active material may correspond to 90 to 99 wt % and specifically 93 to 98 wt % of the total weight of solids in the positive electrode slurry.

The binder is added in an amount of 1 to 30% by weight, on the basis of the total weight of solids in the positive electrode slurry, as a component that assists in bonding between the active material and the conductive material and bonding to the current collector. Examples of such binders include polyvinylidene fluoride, polyvinyl alcohol, carboxymethylcellulose, starch, hydroxypropylcellulose, regenerated cellulose, polyvinylpyrrolidone, tetrafluoroethylene, polyethylene, polypropylene, ethylene-propylene-diene terpolymer, sulfonated ethyl-propylene-diene terpolymer, styrene butadiene rubber, fluorine rubber, and various copolymers.

Such a conductive material is not particularly limited as long as it has electrical conductivity without causing a chemical change in the battery, and examples thereof include: carbon powders such as carbon black, acetylene black, Ketjen black, channel black, furnace black, lamp black, and summer black; graphite powders such as natural graphite and artificial graphite, and graphite, of which the crystal structure has been very much developed; conductive fibers such as carbon fiber and metal fiber; conductive powders such as carbon fluoride, aluminum and nickel powder; conductive whiskey such as zinc oxide and potassium titanate; conductive metal oxides such as titanium oxide; and conductive materials such as polyphenylene derivatives and the like.

The conductive material is usually added in an amount of 1 to 30% by weight based on the total weight of solids in the positive electrode slurry.

The solvent may include an organic solvent such as NMP (N-methyl-2-pyrrolidone), and may be used in an amount that becomes a desirable viscosity when the positive electrode active material and optionally a binder and a conductive material are included. For example, the concentration of the positive electrode active material and, optionally, the solids in the slurry including the binder and the conductive material may be included in an amount of 10 wt % to 70 wt %, preferably 20 wt % to 60 wt %.

The negative electrode may be manufactured by forming a negative electrode mixture layer on a negative electrode current collector. The negative electrode mixture layer may be formed by coating a slurry including a negative electrode active material, a binder, a conductive material, a solvent, and the like on a negative electrode current collector, followed by drying and rolling.

The negative electrode current collector is generally made to a thickness of 3 to 500 micrometers. The negative electrode current collector is not particularly limited as long as it has high electrical conductivity without causing chemical changes in the battery, and examples thereof include copper, stainless steel, aluminum, nickel, titanium, sintered carbon, copper or stainless steel of which the surface has been treated with carbon, nickel, titanium, silver or the like, aluminum-cadmium alloy, or the like. In addition, like the positive electrode current collector, fine unevenness can be formed on the surface to enhance the bonding force of the negative electrode active material, and it can be used in various forms such as a film, a sheet, a foil, a net, a porous body, a foam, and a nonwoven fabric.

Further, the negative electrode active material may include at least one selected from the group consisting of lithium metal, a carbon material capable of reversibly intercalating/deintercalating lithium ions, metal or an alloy of a metal and lithium, a metal oxide, a material capable of doping and dedoping lithium, and a transition metal oxide.

Any carbon-based negative electrode active material, which is generally used in a lithium ion secondary battery, may be used as a carbon material capable of reversibly intercalating/deintercalating the lithium ions, and representative examples thereof may include crystalline carbon, amorphous carbon, or a combination thereof. Some examples of the crystalline carbon may include flaky, spherical, and fibrous natural graphite and artificial graphite, and some examples of the amorphous carbon may include soft carbon, hard carbon, mesophase pitch carbide, and calcined coke.

A metal selected from the group consisting of Cu, Ni, Na, K, Rb, Cs, Fr, Be, Mg, Ca, Sr, Si, Sb, Pb, In, Zn, Ba, Ra, Ge, Al and Sn, or an alloy of lithium and these metals may be used.

One selected from the group consisting of PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, $Bi_2O_5$, $Li_xFe_2O_3$ ($0 \leq x \leq 1$), $Li_xWO_2$ ($0 \leq x \leq 1$), and $Sn_xMe_{1-x}Me'_yO_z$ (Me: Mn, Fe, Pb, Ge; Me': Al, B, P, Si, group 1, group 2 and group 3 elements of the periodic table, halogen; $0 < x \leq 1$; $1 \leq y \leq 3$; $1 \leq z \leq 8$) may be used as the metal oxide.

Some examples of materials capable of doping and dedoping the lithium may include Si, $SiO_x$ ($0 < x \leq 2$), Si—Y alloy (Y is one selected from the group consisting of alkali metal, alkali earth metal, group 13 element, group 14 element, transition metal, rare earth element, and is not Si), Sn, $SnO_2$, Sn—Y (Y is one selected from the group consisting of alkali metal, alkali earth metal, group 13 element, group 14 element, transition metal, rare earth element, and is not Sn), and at least one of them may be mixed with $SiO_2$. One selected from the group consisting of Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, Po, and a combination thereof may be used as the element Y.

Examples of the transition metal oxide include lithium-containing titanium oxide (LTO), vanadium oxide, lithium vanadium oxide, and the like.

The negative electrode active material may be included in 80% by weight to 99% by weight based on the total weight of solids in the negative electrode slurry.

The binder is a component that assists the bonding between the conductive material, the active material and the current collector, and is typically added in an amount of 1 to 30 wt % based on the total weight of solids in the negative electrode slurry. Examples of such binders include polyvinylidene fluoride, polyvinyl alcohol, carboxymethylcellulose, starch, hydroxypropylcellulose, regenerated cellulose, polyvinylpyrrolidone, tetrafluoroethylene, polyethylene, polypropylene, ethylene-propylene-diene polymer, sulfonated ethyl-propylene-diene terpolymer, styrene butadiene rubber, fluorine rubber, and various copolymers thereof.

The conductive material is a component for further improving the conductivity of the negative electrode active material, and may be added in an amount of 1 to 20 wt % based on the total weight of solids in the negative electrode slurry. Such a conductive material is not particularly limited as long as it has electrical conductivity without causing a chemical change in the battery, and examples thereof include graphite such as natural graphite and artificial graphite; carbon black such as acetylene black, Ketjen black, channel black, furnace black, lamp black, and summer black; conductive fibers such as carbon fiber and metal fiber; conductive powders such as carbon fluoride, aluminum and nickel powder; conductive whiskey such as zinc oxide and potassium titanate; conductive metal oxides such as titanium oxide; and conductive materials such as polyphenylene derivatives and the like.

The solvent may include an organic solvent such as water, NMP or alcohol, and may be used in an amount that becomes a desirable viscosity when the negative electrode active material and optionally a binder and a conductive material are included. For example, the concentration of the negative electrode active material and, optionally, the solids in the slurry including the binder and the conductive material may be included in an amount of 50 wt % to 75 wt %, preferably 50 wt % to 65 wt %.

An organic separator or an organic and inorganic composite separator can be used as the separator.

A porous polymer film, which is prepared by a polyolefin-based polymer such as ethylene homopolymer, propylene homopolymer, ethylene/butene copolymer, ethylene/hexene copolymer, and ethylene/methacrylate copolymer, may be used alone, or a laminate thereof may be used as the organic separator. Alternatively, a general porous non-woven fabric such as a non-woven fabric made of a glass fiber having a high melting point, a polyethylene terephthalate fiber, etc. may be used as the organic separator.

An organic/inorganic complex porous safety-reinforcing separator (SRS), which is obtained as a porous coating layer containing inorganic particles and a binder polymer is applied on the porous polyolefin-based separator substrate, may be used as the organic and inorganic complex separator.

Inorganic particles having lithium ion transfer capability or mixtures thereof are preferably used as the inorganic particles, and some examples of the inorganic particles include one or a mixture of two or more selected from the group consisting of $BaTiO_3$, $BaTiO_3$, $Pb(Zr,Ti)O_3$ (PZT), $Pb_{1-x}La_xZr_{1-y}Ti_yO_3$ (PLZT, herein, $0<x<1$, $0<y<1$), hafnia ($HfO_2$), $SrTiO_3$, $SnO_2$, $CeO_2$, $MgO$, $NiO$, $CaO$, $ZnO$, $ZrO_2$, $Y_2O_3$, $Al_2O_3$, $TiO_2$, $SiC$, and a mixture thereof.

The outer shape of the lithium secondary battery of the present invention is not particularly limited, but the lithium secondary battery may have a cylindrical shape using a can, a prismatic shape, a pouch shape or a coin shape.

Hereinafter, the present invention will be described in detail with reference to examples. However, the embodiments according to the present invention may be modified into various other forms, and the scope of the present invention should not be construed as being limited to the examples described below. The examples of the present invention are provided to more fully describe the present invention to those skilled in the art.

Example 1

<Preparation of Non-Aqueous Electrolyte Solution>

A non-aqueous organic solvent was manufactured by mixing ethylene carbonate (EC) and ethylmethyl carbonate (EMC) at the volume ratio of 30:70, and $LiPF_6$ was dissolved so that the concentration becomes 1.0M. Further, 0.5 wt % of vinylene carbonate (VC), 0.1 wt % of the compound represented by the chemical formula 1a, and 0.3 wt % of the vinyl ethylene carbonate (VEC) were added based on the total weight of the non-aqueous electrolyte solution (see Table 1 below).

Further, 0.5 wt % of 1,3-propane sultone (PS), 1 wt % of ethylene sulfate (Esa), 2 wt % of lithium difluorophosphate (LiDFP, $LiPO_2F_2$), and 0.2 wt % of 1,3-propene sultone (PRS) were added to manufacture a non-aqueous electrolyte solution.

<Preparation of Electrode>

A positive electrode active material slurry (50 wt % solids concentration) was manufactured by adding a positive electrode active material ($Li(Ni_{0.6}Mn_{0.2}Co_{0.2})O_2$), a conductive material (carbon black) and a binder (polyvinylidene fluoride) at the weight ratio of 90:5:5, to N-methyl-2-pyrrolidone (NMP) as a solvent. A positive electrode was manufactured by applying the positive electrode active material slurry on a positive electrode current collector (Al film) having a thickness of 100 μm, then drying the slurry and roll-pressing the positive electrode current collector.

A negative electrode active material slurry (60 wt % of solids concentration) was manufactured by adding a negative electrode active material (artificial graphite), a binder (PVDF), and a conductive material (carbon black) at the weight ratio of 95:2:3, to NMP as a solvent. A negative electrode was manufactured by applying the negative electrode active material slurry on a negative electrode current collector (Cu film) having a thickness of 90 μm, then drying the slurry and roll-pressing the negative electrode current collector.

<Preparation of Secondary Battery>

A positive electrode and a negative electrode, which were manufactured in the above-described manner, were sequentially laminated together with a polyethylene porous film, to thereby manufacture an electrode assembly. Thereafter, the electrode assembly was put in a battery case, and the non-aqueous electrolyte solution was injected into the battery case, which was then sealed, to thereby manufacture a lithium secondary battery (battery capacity 2000 mAh).

Examples 2 and 3

A non-aqueous electrolyte solution was manufactured while change the contents of vinylene carbonate (VC), the compound represented by the chemical formula 1a, and vinyl ethylene carbonate (VEC) in the example 1 as shown in Table 1. Further, an electrode and a secondary battery were prepared in the same manner as in Example 1.

Comparative Examples 1 to 6

A non-aqueous electrolyte solution was manufactured while change the contents of vinylene carbonate (VC), the compound represented by the chemical formula 1a, and vinyl ethylene carbonate (VEC) in the example 1 as shown in Table 1. Further, an electrode and a secondary battery were prepared in the same manner as in Example 1.

TABLE 1

| | VC (wt. %) | Compound represented by chemical formula 1a (wt. %) | VEC (wt. %) |
|---|---|---|---|
| Example 1 | 0.5 | 0.1 | 0.3 |
| Example 2 | 0.5 | 0.1 | 0.2 |
| Example 3 | 0.3 | 0.1 | 0.2 |
| Comparative Example 1 | 0.5 | 0.1 | 0 |
| Comparative Example 2 | 0.8 | 0.1 | 0 |
| Comparative Example 3 | 0 | 0.1 | 0.5 |
| Comparative Example 4 | 0.5 | 0 | 0 |
| Comparative Example 5 | 0 | 0 | 0.5 |
| Comparative Example 6 | 0 | 0.1 | 0 |

Experimental Example 1

<Evaluation of Capacity Retention Rate After High Temperature (60° C.) Storage>

In the examples and comparative examples, after performing formation for the manufactured lithium secondary batteries at the condition of 200 mA current (0.1 Crate), respectively, gas in each battery was removed (degassing process).

After moving the degassed lithium secondary battery to a charge-discharge device at a room temperature (25° C.), charging with constant current/constant voltage was performed up to 4.2V at 0.33 C and cut-off charging was performed at 0.05 C, and discharging was performed to 2.5V at 0.33 C. At this time, the charge and discharge was performed 3 times using PNE-0506 charge-discharge device (manufacturer: PNE Solution Co., Ltd., 5V, 6 A), and the lastly measured discharge capacity was defined as in the initial discharge capacity.

Thereafter, the charge at constant current/constant voltage condition with 0.33 C rate until 4.2V, and 0.05 C cutoff charge were performed, which was then stored at 60° C. for 12 weeks.

After moving the lithium secondary battery to a charge-discharge device at a room temperature, charging with constant current/constant voltage was performed up to 4.2V at 0.33 C and cut-off charging was performed at 0.05 C, and discharging was performed to 2.5V at 0.33 C. The charge and discharge was performed 3 times using PNE-0506 charge-discharge device (manufacturer: PNE Solution Co., Ltd., 5V, 6 A). At this time, the last discharge capacity was defined as the discharge capacity after high temperature storage.

The measured initial discharge capacity and the discharge capacity after high temperature storage were applied to the following formula (1) to thereby measure the capacity retention rate, and the result was shown in Table 2 below.

Capacity retention rate (%)=(Discharge capacity after high temperature storage/Initial discharge capacity)×100   Formula (1)

Experimental Example 2

<Evaluation of Resistance Increase Rate After High Temperature (60° C.) Storage>

In the examples and comparative examples, after performing formation for the manufactured lithium secondary batteries at the condition of 200 mA current (0.1 Crate), respectively, gas in each battery was removed (degassing process).

After moving the degassed lithium secondary battery to a charge-discharge device at a room temperature (25° C.), charging with constant current/constant voltage was performed up to 4.2V at 0.33 C and cut-off charging was performed at 0.05 C, and discharging was performed to 2.5V at 0.33 C. At this time, after performing charge and discharge 3 times, respectively, the battery was set to SOC 50% based on the last discharge capacity. At this time, DC internal resistance was measured through a voltage drop which was shown when discharge pulses were given with 5 A (2.5 C) for 10 seconds (PNE-0506 charge-discharge device (manufacturer: PNE Solution Co., Ltd., 5V, 6 A)), and the resistance at this time was defined as the internal resistance.

Thereafter, the charge at constant current/constant voltage condition with 0.33 Crate until 4.2V, and 0.05 C cutoff charge were performed for the lithium secondary battery, which was then stored at 60° C. for 12 weeks.

Thereafter, after moving the lithium secondary battery into a charge-discharge device in a room temperature, and SOC was set to 50%. Then a direct current internal resistance was measured through a voltage drop, which was shown when a discharge pulse was given with 5 A (2.5 C) for 10 seconds, using PNE-0506 charge-discharge device (manufacturer: PNE Solution Co., Ltd., 5V, 6 A), and the internal resistance was defined as the resistance after high temperature storage.

The resistance increase rate (%) for each secondary battery was calculated using the formula (2) from the ratio of a resistance, which increased after high temperature storage compared to the initial resistance, and the result was shown in Table 2 below.

Resistance increase rate (%)={(resistance after high temperature storage−initial resistance)/initial resistance}×100   Formula (2)

Experimental Example 3

<Evaluation of Volume Increase Rate After High Temperature (60° C.) Storage>

In the examples and comparative examples, after performing formation for the manufactured lithium secondary batteries at the condition of 200 mA current (0.1 Crate), respectively, gas in each battery was removed (degassing process).

The degassed lithium secondary battery was moved to a charge-discharge device in a room temperature (25° C.). Thereafter, the charge at constant current/constant voltage condition with 0.33 C rate until 4.2V, and 0.05 C cutoff charge were performed to be fully charged, which was then stored at 60° C. for 12 weeks in order to evaluate the volume increase rate compared to the initial state.

The volume increase rate was measured using TWD-150DM of Two-pls company as follows. First, a lithium secondary battery before high temperature storage was put in a bowl filled with distilled water at 25° C. to measure the initial volume. Then the lithium secondary battery after 12 week storage at 60° C. was put in the bowl, and the volume increase of the distilled water was measured to thereby calculate the volume increase of the lithium secondary battery. The result was calculated as a percentage (%). The results are shown in Table 2.

Experimental Example 4

<Evaluation of Capacity Retention Rate After High Temperature (45° C.) Charge and Discharge>

In the examples and comparative examples, after performing formation for the manufactured lithium secondary batteries at the condition of 200 mA current (0.1 Crate), respectively, gas in each battery was removed (degassing process).

After moving the degassed lithium secondary battery to a charge-discharge device at a high temperature (45° C.), charging with constant current/constant voltage was performed up to 4.2V at 0.33 C and cut-off charging was performed at 0.05 C, and discharging was performed to 2.5V at 0.33 C. At this time, the charge and discharge was performed using PNE-0506 charge-discharge device (manufacturer: PNE Solution Co., Ltd., 5V, 6 A), and the measured discharge capacity was defined as in the initial discharge capacity.

Based on the assumption that the charge and discharge process is one cycle, a total of 200 cycles were performed, and then the measured initial discharge capacity and the discharge capacity after 200 cycles were substituted to the following formula (3) to thereby measure the capacity retention rate, and the result was shown in Table 2 below.

Capacity retention rate (%)=(Discharge capacity after 200 cycles/Initial discharge capacity)×100   Formula (3)

Experimental Example 5

<Evaluation of Resistance Increase Rate After High Temperature (45° C.) Charge and Discharge>

In the examples and comparative examples, after performing formation for the manufactured lithium secondary batteries at the condition of 200 mA current (0.1 Crate), respectively, gas in each battery was removed (degassing process).

After moving the degassed lithium secondary battery to a charge-discharge device at a room temperature (25° C.), charging with constant current/constant voltage was performed up to 4.2V at 0.33 C and cut-off charging was performed at 0.05 C, and discharging was performed to 2.5V at 0.33 C. At this time, after performing charge and discharge 3 times, respectively, the battery was set to SOC 50% based on the last discharge capacity. At this time, DC internal resistance was measured through a voltage drop which was shown when discharge pulses were given with 5 A (2.5 C) for 10 seconds (PNE-0506 charge-discharge device (manufacturer: PNE Solution Co., Ltd., 5V, 6 A)), and the resistance at this time was defined as the internal resistance.

Thereafter, after moving the lithium secondary battery at a high temperature (45° C.), about which the initial resistance was measured, a total of 200 cycles of charge and discharge were performed based on the assumption that the above charge and discharge process was one cycle.

Thereafter, after moving the lithium secondary battery into a charge-discharge device in a room temperature, and SOC was set to 50%. Then a direct current internal resistance was measured through a voltage drop, which was shown when a discharge pulse was given with 5 A (2.5 C) for 10 seconds, using PNE-0506 charge-discharge device (manufacturer: PNE Solution Co., Ltd., 5V, 6 A).

A resistance increase rate (%) was calculated by substituting the measured initial resistance value and the resistance value after 200 cycles into the formula (4), and the result was shown in Table 2 below.

Resistance increase rate (%)={(resistance after 200 cycles−initial resistance)/initial resistance}×100  Formula (4)

Experimental Example 6

<Evaluation of Volume Increase Rate After High Temperature (45° C.) Charge and Discharge>

In the examples and comparative examples, after performing formation for the manufactured lithium secondary batteries at the condition of 200 mA current (0.1 C rate), respectively, gas in each battery was removed (degassing process).

After moving the degassed lithium secondary battery to a charge-discharge device at a high temperature (45° C.), charging with constant current/constant voltage was performed up to 4.2V at 0.33 C and cut-off charging was performed at 0.05 C, and discharging was performed to 2.5V at 0.33 C. Based on the assumption that the charge and discharge process is one cycle, a total of 200 cycles were performed, and then the volume increase rate compared to the initial state was evaluated.

The volume increase rate was measured using TWD-150DM of Two-pls company as follows. First, a lithium secondary battery before 200 cycles of charge and discharge was put in a bowl filled with distilled water at 25° C. to measure the initial volume. Then the lithium secondary battery after 200 cycles of charge and discharge was put in the bowl, and the volume increase of the distilled water was measured to thereby calculate the volume increase of the lithium secondary battery. The result was calculated as a percentage (%). The results are shown in Table 2.

TABLE 2

| | After high temperature storage | | | After 200 cycles | | |
|---|---|---|---|---|---|---|
| | capacity retention rate (%) | Resistance increase rate (%) | Volume increase rate (%) | capacity retention rate (%) | Resistance increase rate (%) | Volume increase rate (%) |
| Example 1 | 94.93 | −3.62 | 12.52 | 94.92 | −5.34 | 16.10 |
| Example 2 | 94.41 | −2.28 | 15.70 | 94.77 | −4.45 | 18.99 |
| Example 3 | 94.00 | 1.32 | 17.18 | 94.31 | −3.10 | 20.24 |
| Comparative Example 1 | 92.63 | 13.70 | 25.95 | 94.14 | −0.64 | 27.07 |
| Comparative Example 2 | 93.51 | 18.70 | 18.99 | 93.87 | −2.33 | 27.82 |
| Comparative Example 3 | 93.91 | 3.42 | 20.45 | 93.60 | −2.20 | 26.75 |
| Comparative Example 4 | 91.25 | 19.85 | 33.21 | 93.20 | 3.25 | 30.32 |
| Comparative Example 5 | 91.07 | 22.30 | 27.58 | 92.22 | 2.95 | 29.22 |
| Comparative Example 6 | 89.25 | 24.28 | 33.39 | 91.88 | 6.78 | 31.84 |

Referring to the above Table 2, when all of vinylene carbonate (VC), vinyl ethylene carbonate (VEC) and the compound represented by the chemical formula 1 a are included, the capacity retention rate, the resistance increase rate, and volume increase rate in a high temperature were more excellent than the case that only 1 or 2 of the above three compounds are included. Further, in the comparative examples 4 to 6 in which only one of the three compounds is included, the battery performance further decreased than the case that only two of the three compounds are included.

Likewise, the non-aqueous electrolyte solution for a lithium secondary battery according to the present invention can effectively remove by-products generated from lithium salt and suppress gas generation due to side reaction by including all of the three kinds of additives. As such, it is possible to form a firm SEI film on a negative electrode and provide lithium secondary battery having excellent high temperature characteristics.

The above description is merely illustrative of the technical idea of the present invention, and those skilled in the art to which the present invention pertains may make various modifications and variations without departing from the essential characteristics of the present invention. Therefore, the drawings disclosed in the present invention are not intended to limit the technical idea of the present invention but to describe the present invention, and the scope of the technical idea of the present invention is not limited by these drawings. The scope of protection of the present invention should be interpreted by the following claims, and all technical ideas within the scope equivalent thereto should be construed as being included in the scope of the present invention.

The invention claimed is:

1. A non-aqueous electrolyte solution for a lithium secondary battery, the non-aqueous electrolyte solution comprising:
    a lithium salt;
    an organic solvent; and
    an additive,
    wherein the additive includes vinylene carbonate, vinyl ethylene carbonate, and a compound represented by chemical formula 1a:

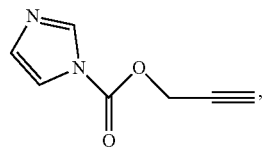

[chemical formula 1a]

and
    wherein the vinylene carbonate is contained in an amount of 0.05 to 5 wt % based on a total weight of the non-aqueous electrolyte solution,
    wherein the vinyl ethylene carbonate is contained in an amount of 0.05 to 3 wt % based on the total weight of the non-aqueous electrolyte solution, and
    wherein the compound represented by chemical formula 1a is contained in an amount of 0.01 to 1 wt % based on the total weight of the non-aqueous electrolyte solution, and
    wherein a weight ratio of the vinylene carbonate to the compound represented by chemical formula 1a is in a range of 3:1 to 5:1, and a weight ratio of the vinyl ethylene carbonate to the compound represented by chemical formula 1a is in a range of 2:1 to 3:1.

2. The non-aqueous electrolyte solution of claim 1, further comprising: at least one additive of a halogen-substituted or unsubstituted cyclic carbonate compound, a nitrile compound, a phosphate compound, a borate compound, a sultone compound, a lithium salt compound, or a sulfate compound.

3. The non-aqueous electrolyte solution of claim 1, wherein the lithium salt contains $LiPF_6$.

4. The non-aqueous electrolyte solution of claim 1, wherein the organic solvent includes a linear carbonate compound and a cyclic carbonate compound.

5. A lithium secondary battery including:
    a positive electrode;
    a negative electrode;
    a separator; and
    the non-aqueous electrolyte solution according to claim 1.

* * * * *